(No Model.) 4 Sheets—Sheet 1.

B. A. FISKE.
PRINTING TELEGRAPH.

No. 389,142. Patented Sept. 4, 1888.

Fig. 1

Fig. 1a — Unison Apparatus

Fig. 3

Attest:
Geo. W. Breek
C. E. Ashley

Inventor:
Bradley A. Fiske
By his attorney
C. K. Buckingham (No Model.) 4 Sheets—Sheet 3.

B. A. FISKE.
PRINTING TELEGRAPH.

No. 389,142. Patented Sept. 4, 1888.

(No Model.)

B. A. FISKE.
PRINTING TELEGRAPH.

No. 389,142.  Patented Sept. 4, 1888.

UNITED STATES PATENT OFFICE.

BRADLEY A. FISKE, OF THE UNITED STATES NAVY, ASSIGNOR TO THE WESTERN UNION TELEGRAPH COMPANY, OF NEW YORK, N. Y.

PRINTING-TELEGRAPH.

SPECIFICATION forming part of Letters Patent No. 389,142, dated September 4, 1888.

Application filed August 13, 1888. Serial No. 282,481. (No model.)

*To all whom it may concern:*

Be it known that I, BRADLEY A. FISKE, of the United States Navy, a citizen of the United States of America, temporarily residing at the New York Navy-Yard, have made a new and useful Improvement in Printing-Telegraphs, of which the following is a specification.

My invention relates to that class of printing-telegraphs in which the type-wheel is advanced to a position to print by either or both of two independent movements, motors, or mechanisms; and the particular feature of my improvement consists in the employment of two mechanisms which are capable of simultaneous operation, the speed of rotation imparted to the type-wheel by one mechanism being supplemented by that of the other. Others have heretofore employed two mechanisms, one for rotating the type-wheel through long and the other through short spaces at each step; but in none of these devices can the two step-by-step mechanisms be simultaneously operated. With my arrangement, if it were desired to set the type-wheel to print, say, the fourteenth letter from the zero point, it being understood that the type-wheel is moved the space of six letters at each long step and one letter at each short step, the entire operation would be performed by means of two step-by-step movements of each of the two mechanisms, for the double action of one would effect rotation through the space of twelve letters, and that of the other simultaneous rotation through the space of two letters.

My invention also contemplates the use of two type-wheels connected together and rotated, as above described, from either of which characters may be printed—letters from the one and figures from the other—at the will of the transmitting operator; and it also includes suitable apparatus, forming parts of the transmitting and receiving apparatus, for accomplishing such results.

I will now describe the best forms of apparatus to me known for carrying out my invention, including several modifications, by reference to the accompanying drawings.

Fig. 1ᵃ represents a well-known unison device which, with the form of apparatus shown in Figs. 1, 2, and 3, it is necessary to employ.

Figure 1:
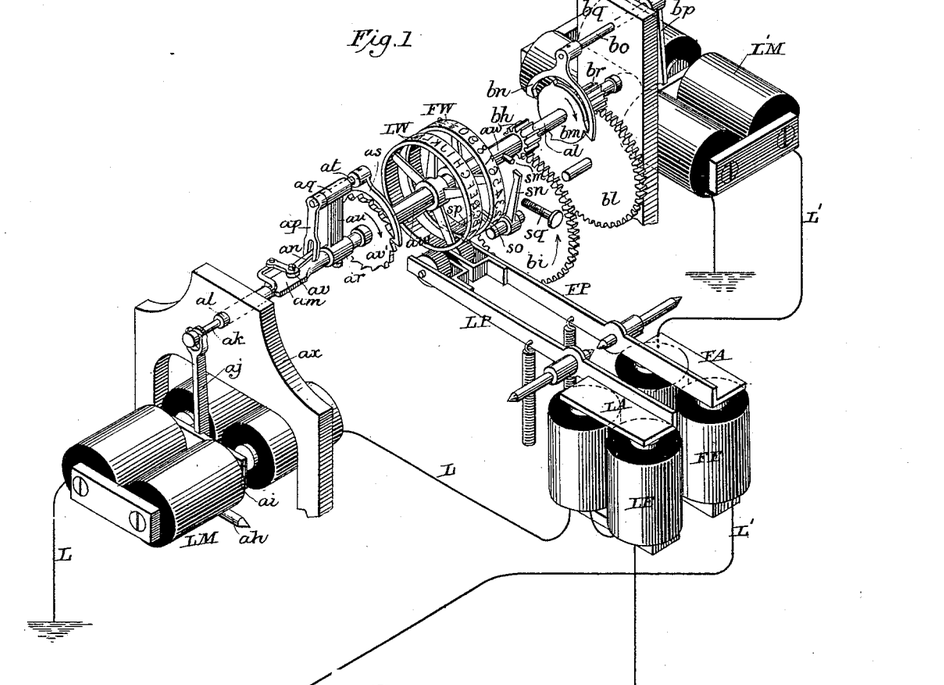
Figure 1 represents those parts of a receiving-instrument which are essential to an explanation of my invention.

Referring now to Fig. 1, L W and F W are letter and figure type wheels, respectively, which are rigidly connected together and to a sleeve, $a\ w$, said sleeve being provided at one end with a ratchet escapement-wheel, $a\ v'$, which is rigidly attached thereto, while the other end of said sleeve is provided with a rigidly-connected pinion, $b\ h$, which meshes with the spur-wheel $b\ i$, forming a part of the train of a propelling motor. The type-wheel sleeve $a\ w$ is mounted upon a shaft, $a\ l$, which is journaled near each end in the upright supports $a\ x$ and $b\ q$, and is provided at one end with escapement-wheel $b\ m$ and a pinion, $b\ r$, the latter meshing with the spur-wheel $b\ l$, which is driven by a second and independent motor. The opposite end of said shaft is hollow, and at the right of the bearing in upright $a\ x$ it is flattened out to a form as shown at $a\ m$, while still further to the right a radial arm, $a\ u$, is rigidly connected thereto by means of the sleeve $a\ r$. The radial arm $a\ u$ serves as a support for the journal-bearing $a\ q$, within which passes the shaft $a\ t$, to one end of which is rigidly connected the escapement-yoke $a\ s$, through which the escapement-wheel $a\ v'$ is permitted to rotate step by step, thus giving the type-wheels and their sleeve $a\ w$ rotation in respect to the shaft $a\ l$. The opposite end of the shaft $a\,t$ is rigidly connected with the arm $a\,p$, which is slotted at its free end, and within said slot an arm, $a\,n$, of the bell-crank $a\,v$ projects. Said bell-crank $a\,v$ is pivotally supported upon the flattened portion $a\,m$ of the shaft $a\,l$, and its other arm is jointed to the spindle $a\,k$, which passes through the hollow portion of the shaft $a\,l$. The spindle $a\,k$ at its outer end is provided with a grooved hub, and within said groove the forked arms of armature-lever $a\,j$ project. The armature-lever $a\,j$ is provided with an armature, $a\,i$, and is supported upon the pivoted bearing $a\,h$. Thus upon the passage of reversed electrical impulses through the coils of polarized electro-magnet L M, forming a part of the main line L, armature-lever $a\,j$ is vibrated, and the stem $a\,k$ is given a to-and-fro longitudinal movement, carrying with it the end of the bell-crank lever to which it is joined, thereby imparting a vibratory movement to arm $a\,p$ and the escapement-yoke $a\,s$. By this means the type-wheels are given a step-by-step rotation through a space at a time represented by one character upon each type-wheel, and the type-wheels may be thus rotated to any desired extent. An inspection of the drawings shows that the step-by-step impelling mechanism, carried by and rotated with the shaft for rotating the type-wheel around the shaft, may be greatly changed in details of construction without departing from the invention. Upon the transmission of reversed impulses over line L' and through the coils of electro-magnet L' M, armature-lever $b\,p$ is vibrated, and with it the shaft $b\,o$, which is journaled in the upright $b\,q$. In this manner vibration is imparted to the escapement-yoke $b\,n$, thereby permitting a step-by-step rotation of escapement-wheel $b\,m$ and shaft $a\,l$, which is constantly under the influence of the second clock-motor, with which spur-wheel $b\,l$ is geared. Thus through the agency of the impulses on line L' shaft $a\,l$ is rotated through the space of several letters at a step, and with it the type-wheels L W and F W. The shaft $a\,l$ and type-wheel sleeve $a\,w$ are locked together through the arm $a\,u$ and escapement-yoke $a\,s$ and ratchet-wheel $a\,v'$ at all times, except when the armature $a\,j$ and ratchet-yoke $a\,s$ are undergoing vibration. It will now be seen that if a single impulse were sent over L' only, the type-wheels would be rotated through the space, say, of six letters. If, on the other hand, an impulse were sent over the line L only, the type-wheels would be rotated through the space of one letter, and if one impulse were sent over each of the lines L and L' simultaneously the type-wheels would be rotated through the space of seven letters by the simultaneous action of the two escapements.

For convenience of description I will designate one escapement as the "group-escapement" and the other as the "letter-escapement"—that is, through the agency of one escapement the type-wheels are rotated through a space representing a group of characters thereon, say, of six letters, while the other escapement permits the type-wheels to rotate only through the space represented by one letter at a step.

During the operation of the group-escapement the entire apparatus of the letter-escapement rotates with the shaft $a\,l$; but in all positions of rotation the letter-escapement is capable of operation, and with each movement it imparts a simultaneous and supplemental motion to the type-wheels, though it is apparent that during the non-action of the group-escapement the radial arm $a\,u$ of the letter-escapement will remain in a fixed position, and while in this position if the letter-escapement be operated the type-wheels may be given any desired amount of rotation.

Although I have shown two escapements controlled by two independent main lines, L and L', it is obvious that both escapement electro-magnets might be included in the same main line; but with such an arrangement it would be necessary that one of said magnets be neutral and the other polarized, the neutral magnet to be operated by changes in current-strength and the polarized magnet by current-reversal, as is done in the ordinary form of quadruplex telegraph apparatus now in general use. Other combinations of electro-magnets all included in one main line could also be employed for operating the two escapements simultaneously or successively, as occasion required. Where, however, two type-wheels are employed, it is preferable to employ two main lines, one including press-magnets for operating the press of the letter type-wheel and the other for operating a second press for the figure type-wheel. In this arrangement press-magnet L E in the main line L is included with the letter-escapement magnet, while press magnet F E is included in main line L' with the escapement-magnet L' M of the group-escapement, and in this connection L P and F P respectively represent independent press levers which are connected with the armature L A and F A.

Figure 1A:
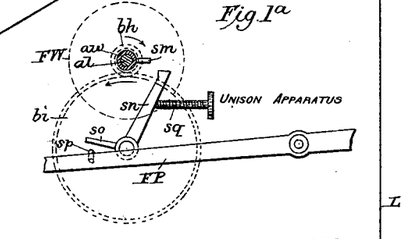

I have shown the ordinary form of unison mechanism in Figs. 1 and 1$^\mathrm{a}$, in which a frictionally-mounted arm, $s\,n$, is supported upon a slowly-moving shaft of a clock-train for rotating the sleeve $a\,w$. Upon two complete rotations of the type-wheel the arm $s\,n$ will be brought into the path of the radial arm $s\,m$ of sleeve $a\,w$, thus locking the type-wheels at the unison point, and to disengage the unison the press-lever F P is raised, the arm $s\,p$ striking arm $s\,o$ and driving lever $s\,n$ against its back-stop $s\,q$ and out of the path of the radial arm $s\,n$. The necessity for this form of unison or one of a similar character will be hereinafter explained in connection with the transmitting apparatus.

Figures 4, 5:
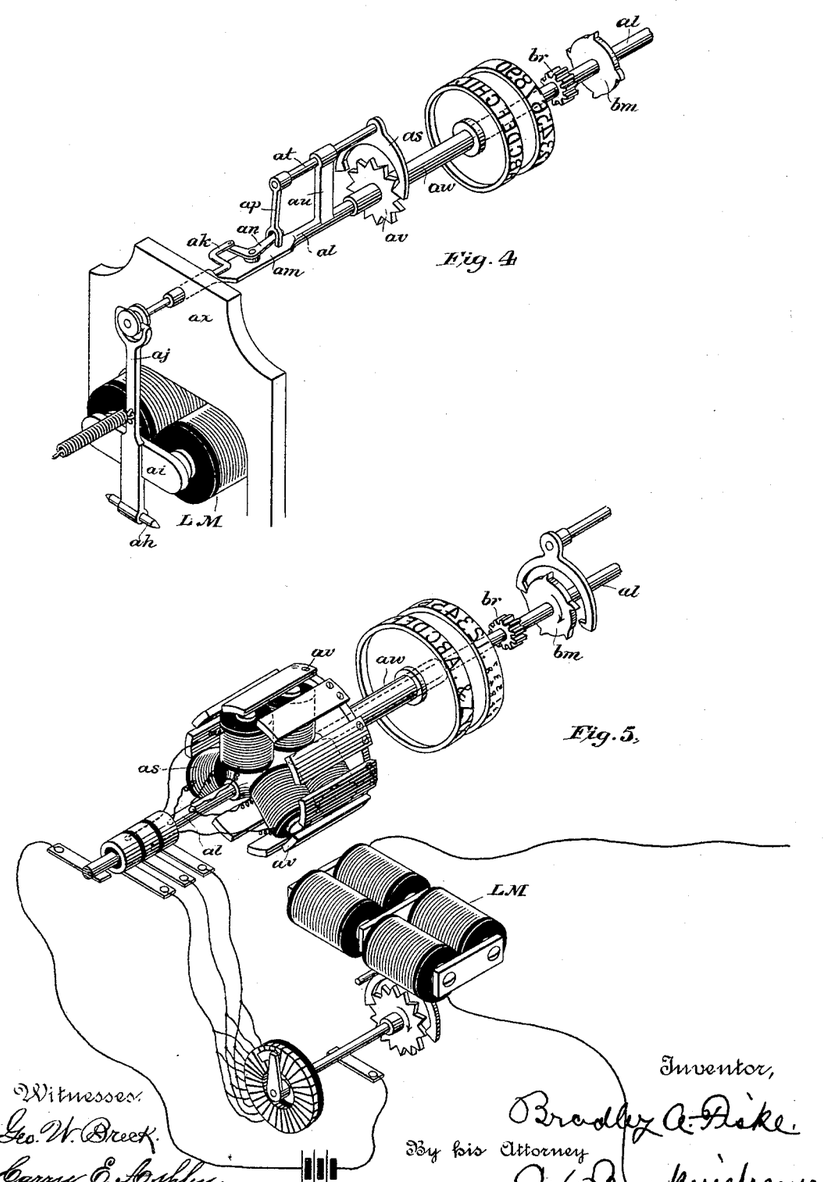
Fig. 4 represents a modification in which clock-motors are dispensed with and in which step-by-step movement is effected by the positive driving action of an anchor or pawls.
Fig. 5 represents a modification in which the escapement mechanism for rotating the type-wheel around its shaft consists of a rotary electro-magnetic motor.

In Fig. 4 a driving-anchor, $a\,s$, and star-wheel $a\,v$, in place of a releasing-escapement and corresponding escape-wheel, are employed. By this arrangement a clock-motor, constantly tending to rotate the type-wheel around the shaft $a\ l$, is dispensed with, and the entire power necessary to rotate the type-wheel around the shaft is furnished by the step-by-step impelling mechanism, which is carried by and rotated with the shaft. The anchor $a\ s$, when held either at the right or the left, firmly locks the type-wheels to the shaft, and by each movement in either direction the type-wheel is given a step of rotation. This form of escapement is particularly described in United States Patent of G. M. Phelps, No. 91,662, dated June 22, 1869.

Many different forms of step-by-step impelling mechanism may be employed in this connection, and particularly that shown in United States Patent of E. A. Calahan, No. 76,993, dated April 2, 1868.

Fig. 5 shows a modification in which an anchor-escapement for rotating the type-wheel around or in respect to shaft $a\ l$ is dispensed with. In this case the type-wheel is rigidly joined to a rotating armature, $a\ v$, of an electro-magnetic motor, whose field-magnets $a\ s$ are affixed to shaft $a\ l$, and by means of main-line magnet L M and a sunflower device, as shown in the diagram, electrical currents are successively transmitted through the three field-magnets, thus imparting a step-by-step movement to the armature and causing the type-wheel to rotate the space of one character around the shaft upon each movement of the armature of L M. When a continuous current is sent through such magnet, the sunflower-arm is held in a fixed position, and a continuous current from the local battery is transmitted through one of the field-magnets $a\ s$, thus holding one of the armature-bars $a\ v$ opposite to its poles. By this means the type-wheel is locked to shaft $a\ l$, and movement imparted to the latter is communicated to said wheel. Obviously this step-by-step impelling mechanism could be inverted by placing the rotating armature $a\ v$ upon shaft $a\ l$ and the field-magnets $a\ s$ upon sleeve $a\ w$. A rotary electro-magnetic motor, such as is shown in Fig. 5, could also be employed as the step-by-step impelling mechanism for rotating shaft $a\ l$ in place of the motor operating through pinion $b\ r$, escapement-wheel $b\ m$, and its releasing anchor. The rotary electro-magnetic motor here shown is illustrated in United States Patent of G. M. Phelps, No. 267,366, dated November 14, 1882.

Figure 6:
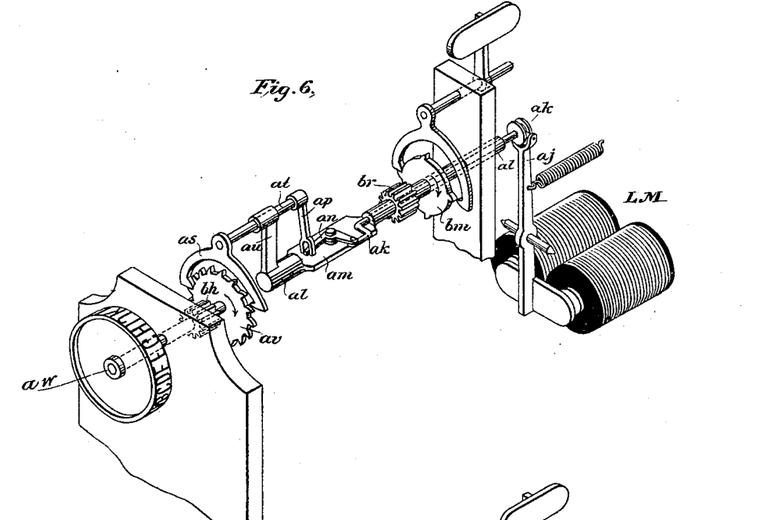
Fig. 6 illustrates a modification in which the type-wheel, instead of being placed upon a sleeve, is affixed to a second or independent shaft, the two shafts being joined together by means of step-by-step mechanism.

Another modification (shown in Fig. 6) illustrates an arrangement in which no sleeve is used. The type-wheel in this instance is mounted upon a shaft, $a\ w$, which corresponds with sleeve $a\ w$ in Figs. 1, 4, and 5. Wheel $a\ v$ is controlled by anchor $a\ s$, and may be under the influence of a motor constantly tending to impart rotation to it through a pinion, $b\ h$, or wheel $a\ v$ may be positively rotated by anchor $a\ s$ in the manner shown in Fig. 4. The long step escapement or impelling mechanism $b\ m$ is affixed to shaft $a\ l$, and upon the latter is mounted radial arm $a\ u$, carrying shaft $a\ t$ and anchor $a\ s$, the latter being vibrated by arm $a\ p$, bell-crank $a\ n$, spindle $a\ k$, armature $a\ j$, and magnet L M.

Figure 7:
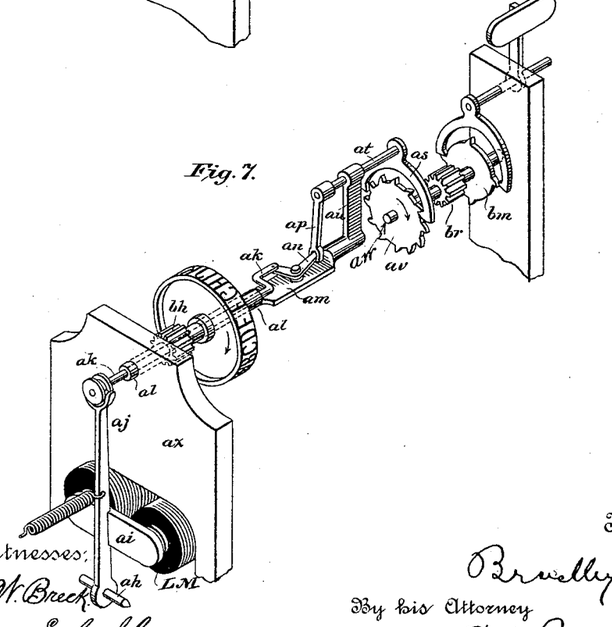
Fig. 7 illustrates a second modification, in which a sleeve is dispensed with, the type-wheel being placed upon a second shaft and joined to the first by means of step-by-step mechanisms.

Fig. 7 shows a second modification, in which a sleeve is dispensed with. Unlike the arrangement shown in Fig. 6, anchor $a\ s$, or the step-by-step impelling mechanism for causing rotation of the type-wheel in respect to shaft $a\ w$, is carried by and rotated with the type-wheel, while wheels $b\ m$ and $a\ v$ of both the long and short step escapements are fixed to shaft $a\ w$. The type-wheel is placed upon shaft $a\ l$, which is provided with a flattened part, $a\ m$, and has a radial arm, $a\ u$, carrying the anchor-shaft $a\ t$. As in the preceding modifications, anchor $a\ s$ is vibrated by means of arm $a\ p$, bell-crank $a\ n$, stem $a\ k$, armature-bar $a\ j$, and magnet L M.

Releasing-anchors and continuously-acting motors are here shown, though, as observed of other modifications, step-by-step movement may be effected by positive driving action.

The conditions of operation of the receiving-instrument are that impulses shall be sent simultaneously or successively over the two main lines L and L', thereby simultaneously or successively actuating the group and letter escapements without actuating either of the press devices until both escapements have performed their respective functions of bringing the type-wheels to their required position; but, when brought to position, that one of the press-magnets corresponding with the letter-wheel from which impressions are to be taken must be operated. To accomplish this result the mere prolongation of impulses over the main lines will not suffice, for printing would be effected immediately from both wheels as soon as the two escapements had performed their respective functions. To avoid this difficulty, in addition to the battery which is employed to actuate the escapements, batteries are employed which can be thrown upon one line or the other at the moment the type-wheels are brought to their proper position for the purpose of actuating the press mechanism. The arrangement of the apparatus by which these conditions are fulfilled will now be explained by reference to Fig. 2.

Figure 2:
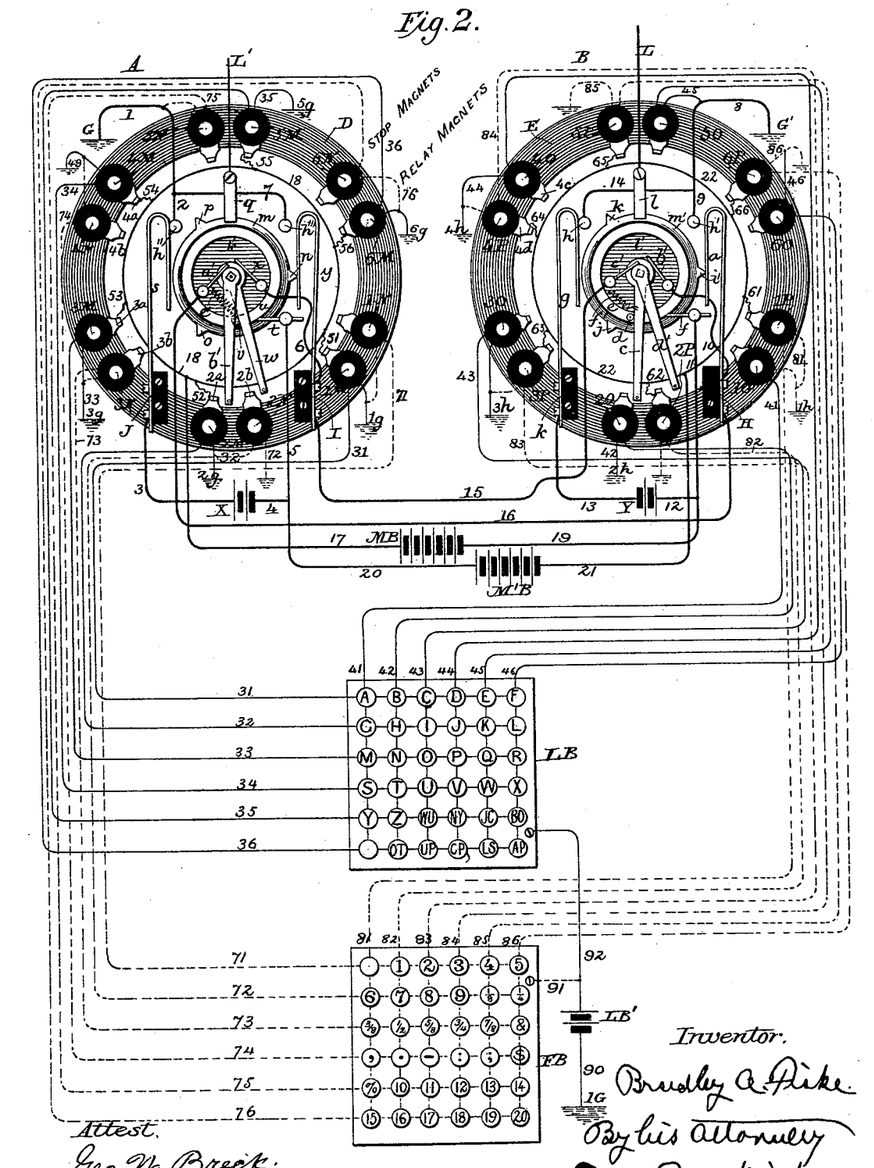
Fig. 2 represents a diagram of a transmitter suitable for operating the receiving-instrument shown in Fig. 1.

In Fig. 2, A and B are two transmitters, A being employed for directing reversed impulses over the main line L' to control the group-escapement, while B serves to direct reversed impulses over the main line L to control the operation of the letter-escapement of the receiving-instrument. Both transmitters A and B are automatically controlled from the key-board L B, the first through the group of wires 31 32 33 34 35 36, and the second by wires 41 42 43 44 45 46. In like manner said transmitters are automatically controlled from the figure key-board F B, the first by the group of wires 71 72 73 74 75 76, and the second by the wires 81 82 83 84 85 86. All of these wires affording communication from the key-boards to the two transmitters are normally in open local circuit, with their terminals at the transmitters connected to earth. These local circuits are formed upon the depression of the transmitting-keys through the wire 92 from the board L B to local battery L B', wire 90, and thence to earth $l$ G, and from the figure key-board F B by wire 91, battery L B', wire 90, and ground $l$ G. Battery X is so arranged in respect to the main line and the transmitter-connections that, upon its operation, the poles thereof are constantly reversed, and positive and negative impulses are transmitted to line for the purpose of controlling the group-escapement at the receiving-instrument. In the same manner battery Y is reversed upon the operation of transmitter B for the purpose of furnishing to and-fro impulses over the main line L to control the letter-escapement. Batteries M B and M' B are each connected with both transmitters, and in such a way that upon the depression of a letter-key the battery M B is thrown in circuit with the battery Y upon the main line L, but only when both transmitters have been brought to rest and locked. The operation of the transmitters is such that the battery M' B at such time is not brought into circuit, nor is any additional battery thrown upon the main line L', and thus it is that printing is effected from the letter type-wheel only. In the same manner, upon the depression of a figure key of the board F B when both transmitters are brought to rest in proper position, the battery M' B is brought into circuit with battery X in the main line L', and at such times the battery M B is left in open circuit, and no additional battery is thrown upon line L, thus permitting printing to be effected upon the letter typewheel only. Either the positive or negative poles of the batteries M B and M' B will be directed to line according as the last impulse transmitted from the battery X or Y was positive or negative—that is to say, if the last impulse transmitted from battery Y before printing was negative, the battery M B would be inserted in the main-line circuit with its negative pole to line, thereby re-enforcing the current from battery Y. On the other hand, if the last impulse before printing from battery Y was positive, the positive pole of battery M B would be connected to line, also re-enforcing the current from battery Y. The batteries X and M B are arranged with reference to each other and to line L' precisely in the same manner as are batteries M' B and Y in respect to line L.

Referring, now, particularly to the details of construction of the transmitters in A, D is a circular base-board provided with a set of six relay electro-magnets 1 M 2 M 3 M 4 M 5 M 6 M; also, with a series of six stop-magnets, 1 N 2 N 3 N 4 N 5 N 6 N, and $m$ is a metallic ring having three contact-teeth, $n\ o\ p$, and is mounted upon a rotary hub of insulating material, $k'$. The teeth $n$, $o$, and $p$ are successively and alternately brought into contact with springs $s$ and $y$, and spring $q$, pressing upon the upper disk of the annulus $m$, thereby affords a connection from it to line L' during rotation. As shown in Fig. 2, tooth $n$ having come in contact with the free end of spring $y$, it has caused said spring to be moved away from the metallic post $h'''$, thus breaking electrical connection at that point. At the same time spring $s$ rests against post $h''$, completing connection between said spring and the wire 2. Upon a further rotation of sixty degrees tooth $o$ will have come in contact with spring $s$, thereby breaking connection between said spring and wire 2. At the same time tooth $n$ will have left spring $y$, and connection will have been established between wire 7 and spring $y$. Upon an additional rotation of sixty degrees tooth $p$ will have come in contact with spring $y$, thereby again breaking connection between said spring and wire 7, while connection between spring $s$ and wire 2 will again have been established. Thus for each rotation of $m$ the springs $s$ and $y$ will open and close their respective circuits three times. The second metallic annulus $u$ is insulated from ring $m$ and mounted upon the insulating hub or disk $k'$. The periphery of ring $u$ being in rubbing contact with the stationary spring $t$, electrical connection is normally established through the ring $u$ from wire 5 and contact-spring $t$ to the upwardly-projecting pin $v$, rotating arm $w$, stationary brush $x$, and wire 6. Upon arresting the rotating arm $w$ the rotating hub and its ring $u$ and the upwardly-projecting pin $v$ will momentarily continue their rotation and thereby contact between arm $w$ and pin $v$ will be broken. Arm $w$ is arrested only by the arms of the stop-magnets 1 N 2 N 3 N 4 N 5 N 6 N upon completing the local circuits through the figure key-board F B from battery L B'. Upon depressing any one of the figure-keys a local circuit will be completed through some one of these six stop-magnets, and the rotating arm $w$, upon arriving at the stop-magnet through which the local circuit has been closed, will be arrested by the raising of its armature into the path of said rotating arm. Upon releasing the rotating arm $w$ from the armature of the stop-magnet, the spring $e'$, which connects arm $w$ with the insulating-disk $k'$, immediately brings arm $w$ again into contact with pin $v$. As before stated, rotating disk $k'$ is itself arrested a moment after stopping the rotation of arm $w$, but not until arm $w$ and pin $v$ have been separated. This space of separation, however, is very small and only sufficient to break electrical connection. Rotating arm $b'$ is mounted upon the same shaft with arm $w$ and rotating hub $k'$, but is never arrested, except by means of the armatures of the relay-magnets 1 M 2 M 3 M 4 M 5 M 6 M. Electrical connection is established upon depressing any letter-key and raising the corresponding relay-armature through arm $b'$, as follows: wire 16, brush $a'$, arm $b'$, one of the relay armatures—for example, 2 $a$—and wire 52 to wire 18, the latter being connected by wire 17 to the battery M B. The relay-armatures are respectively connected by wires 51 52 53 54 55 56 to the common wire 18, and this is connected to the battery M B by the wire 17. Thus upon the depression of any one of the letter-keys electrical connection will be established from battery M B through some one of the relay-armatures and the rotating arm $b'$. The arrangement of the springs $a'$ $x$, arms $b'$ $w$, rings $u$ $m$, and insulating-disks $k'$ is more clearly shown in Fig. 3. As there seen, the arm $b'$ is metallically connected with the shaft $c''$, against which rests the free end of spring $a'$ in rubbing contact. The arm $w$ is connected to a metallic hub, $a''$, which is metallically connected with a second metallic hub, both of which are insulated from the shaft $c''$, and upon the latter the free end of spring $x$ rests in rotating contact.

Figure 3:
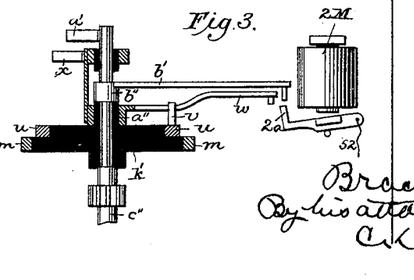
Fig. 3 represents certain details of the transmitter.

Fig. 3 also shows relay-magnet 2 M, one of the six relay-magnets, with its armature 2 $a$ and its connecting-wire 52, for making connection between arm $b'$ and the wire 18. None of the stop-magnets are shown in Fig. 3. They, however, are in construction the same as the relay-magnet 2 M, except that their armatures only serve to arrest the arm $w$ without establishing electrical connection between said arm $w$ and the armatures of said stop-magnets.

The construction and operation of the transmitter B are the same as of A, with the exception that the rotating arm $c$, which corresponds with the arm $w$ in transmitter A, is placed in advance of the arm $d'$, which corresponds with the arm $b'$, and likewise the stop-magnets 10 20 30 40 50 60 are placed in advance of the relay-magnets 1 P 2 P 3 P, &c. This arrangement, however, in the transmitter B could be reversed, and arm $d'$ and the relay-magnets placed in advance of arm $c$ and the stop-magnets.

In transmitter B the relay-armatures are respectively connected to a common wire, 22, by means of wires 61 62 63 64 65 66, and said wire 22 is connected to battery M' B by means of wire 21. It will now be noticed that the relay-magnets of transmitter A are connected only with the letter key-board, while the relay-magnets of transmitter B are connected only with the figure key-board. Likewise while the stop-magnets of transmitter A are connected only with the figure key-board, the stop-magnets of transmitter B are connected only with the letter key-board. If, now, letter-key A be depressed, the local battery L B' will be connected both to wires 31 and 41 and thence to relay-magnet 1 M of transmitter A and to stop-magnet 10 of transmitter B. Likewise upon the depression of key H of the letter key-board the local battery L B' will be connected by wire 32 with the relay-magnet 2 M of transmitter A and by wire 42 to stop-magnet 20 of the transmitter B, and upon depressing the keys I J K L successively it will be observed that while the local battery is constantly connected by wire 32 with the relay-magnet 2 M of transmitter A it will be successively joined by wires 43, 44, 45, and, 46 with stop-magnets 30, 40, 50, and 60, and the transmitter B will rotate step by step, while transmitter A is held stationary. It will also be observed that if after the depression of key H the keys N T Z O T be successively depressed, connection from the local battery will in each case be made by wire 42 to stop-magnet 20 of transmitter B, while said local battery will be successively connected by wires 33, 34, 35, and 36 to the relay-magnets 3 N 4 N 5 N 6 N of transmitter A, and thereby, while the transmitter B is arrested by the armature of stop-magnet 20, the transmitter A will continue its rotation step by step. Now if, after the depression of the key A, key B be depressed, no change in electrical condition upon the main line L' will ensue, but a reversal of current will occur upon the main line L. Again, if key C be depressed after B, a second reversal upon line L will occur, and so on, and by this means the letter-escapement of the receiving-instrument will be worked step by step. The characters in each of the six horizontal lines upon each of the key-boards represent what I have termed a "group." As shown in Fig. 2, the rotating arms of transmitter A are near a position to be arrested either by stop-magnet 2 N or relay-magnet 2 M. If, now, the letter-key H be depressed, transmitter A will be arrested the relay-magnet 2 M and transmitter B will be arrested by stop-magnet 20. In this case electrical connection between pin $v$ and arm $w$ of transmitter A will be continued, while connection between pin $d$ and arm $c$ of transmitter B will be disconnected. On the other hand, if, instead of depressing letter-key H, the figure-key 7 of the figure-board be depressed, transmitter A will be arrested by the stop-magnet 2 and transmitter B will be arrested by the relay-magnet 2 P. In this case, however, electrical connection between pin $v$ and arm $w$ of transmitter A will be broken, while connection between pin $d$ and arm $c$ of transmitter B will remain closed—that is to say, upon depressing figure-keys connection between $v$ and $w$ will be broken, whereas upon depressing letter-keys it will remain closed. Likewise upon depressing figure-keys contact between pin $d$ and arm $c$ will remain closed, whereas upon depressing letter-keys such contact will be broken. It is to be observed that the arms in both transmitters will be arrested in substantially the same position upon the depression of the figure-key 7 as upon the depression of the letter-key H, the only difference being that the connections between $v$ and $w$ of transmitter A and $c$ and $d$ of transmitter B will be changed. It is due to this change of connection that an additional battery is thrown over one main line or the other for the purpose of effecting printing from the letter or figure type-wheel, as occasion may require.

The two transmitters A and B rotate independently in respect to each other, each being driven by a separate and independent motor, though for obvious reasons their speeds of rotation are made substantially equal. I will now describe the circuits and arrangement of batteries therewith for the different conditions of operation of the two transmitters.

First. During rotation of transmitter A, and while tooth $n$ is in contact with spring $y$ and spring $s$ is in contact with pin $h''$, the main-line circuit will be as follows: Beginning at ground G, it will be by way of wire 1, wire 2, spring $s$, wire 3, battery X, wire 4, wire 5, brush $t$, annulus $u$, pin $v$, rotating arm $w$, stationary brush $x$, wire 6, spring $y$, tooth $n$, annulus $m$, brush $q$, and main line L', thus placing the negative pole of battery X to line and the positive pole to earth. Upon the further rotation of the transmitter until tooth $o$ comes in contact with spring $s$, thereby breaking its contact with pin $h''$ and permitting spring $y$ to come in contact with post $h'''$, the circuit beginning at ground G will be as follows: Wire 1, wire 7, pin $h'''$, spring $y$, wire 6, stationary brush $x$, rotating arm $w$, pin $v$, brush $t$, wire 5, wire 4, battery X, wire 3, spring $s$, tooth $o$, annulus $m$, brush $q$, and main line L'. In this position of rotation the positive pole of battery X is connected to line and its negative pole to earth. This change of circuit will recur six times during each rotation. If, now, while the transmitter A is rotating, transmitter B is held stationary, a weak continuous current, either positive or negative, will flow from battery Y over main line L, thus locking the letter-escapement, and at such time the type-wheels only derive their rotation from the group-escapement.

Second. Transmitter B, when in position of rotation shown in Fig. 2, has its circuit from ground G' to the main line as follows: Wire 8, wire 14, pin $h$, spring $g$, wire 13, battery Y, wire 12, wire 11, spring $f$, annulus $e$, pin $d$, rotating arm $c$, brush $b'$, wire 10, spring $a$, tooth $i'$, annulus $m'$, brush $l$, and main line L. Upon the further rotation of sixty degrees of transmitter B tooth $j$ will come in contact with spring $g$, breaking its connection with pin $h$, and at the same time tooth $i'$ by its movement will permit spring $a$ to come in contact with spring $h'$. The circuit from ground G' to the main line L will then be as follows: Wire 8, wire 9, pin $h'$, spring $a$, wire 10, brush $b'$, rotating arm $c$, pin $d$, annulus $e$, brush $f$, wire 11, wire 12, battery Y, wire 13, spring $g$, tooth $j$, annulus $m'$, brush $l$, and main line L. In the latter case the negative pole of battery Y will be placed to the main line and its positive pole to earth, whereas in the preceding position of rotation the positive pole was connected to line and the negative pole to earth. During rotation of transmitter B positive and negative impulses are being transmitted over the main line L, and if, at the same time, transmitter A is arrested, a weak impulse, either positive or negative, will be transmitted over the main line L'. Thus, while weak impulses are being transmitted over line L to actuate the letter-escapement of the receiving-instrument, a continuous current will be transmitted over the main line L', and the group-escapement will at such times be held stationary. It should here be noticed that upon the arresting of one transmitter while the other is in rotation, neither of the batteries M B nor M' B will be connected in circuit. These batteries can only be brought into circuit when both transmitters are arrested.

Third. If, now, both transmitters be permitted to rotate freely, positive and negative impulses will be simultaneously transmitted over both of the main lines L and L', and both of the escapements of the receiving-instruments will be simultaneously operated.

Fourth. If, however, the letter-key H be depressed, relay-magnet 2 M of transmitter A and stop-magnet 20 of transmitter B will arrest the rotating arms $b'$ and $c$, when the circuit from the main line L to earth through the transmitters will be as follows: Main line L, brush $l$, annulus $m'$, tooth $i'$, spring $a$, wire 16, brush $a'$, rotating arm $b'$, relay-armature 2 $a$, wire 52, wire 18, wire 17, battery M B, wire 19, wire 12, battery Y, wire 13, spring $g$, pin $h$, wire 14, and wire 8 to earth G', thus leaving the positive poles of battery Y and M B connected to line with their negative poles connected to earth. It will also be seen that upon a further rotation of sixty degrees of transmitter B, and again locking the arms, battery M B will again be brought into circuit, but that in this case the negative pole of both batteries M B and Y will be connected to line, with their positive poles connected to earth. The polarity of current transmitted from batteries M B and Y is entirely determined by the transmitter B. Transmitter A does not in any way serve to determine the polarity of current on line L. If, now, for example, the figure-key 7 be depressed, the transmitters will be arrested by the stop-magnet 2 N in A and by the relay-magnet 2 P in B. In this case the battery M' B will be included in the circuit of main line L', and the circuit from said main line to earth will be as follows: main line L', brush $q$, annulus $m$, tooth $n$, spring $y$, wire 15, brush $c'$, arm $d'$, armature of relay 2 P, wire 62, wire 22, wire 21, battery M' B, wire 20, wire 4, battery X, wire 3, spring $s$, pin $h''$, wire 2, wire 1, and ground G. Upon a further rotation of transmitter A sixty degrees and the locking of the arms in such position, the circuit from line L' will be as follows: Brush $q$, tooth $o$, spring $s$, wire 3, battery X, wire 4, wire 20, battery M' B, wire 21, wire 22, wire 62, armature of relay-magnet 2 P, rotating arm, $d'$, brush $c'$, wire 15, spring $y$, pin $h'''$, wire 7, wire 1, to earth G. In this latter case the positive poles of batteries X and M' B will be directed to the main line L', with their negative poles to earth, whereas in the preceding position of rotation the negative poles of said batteries were connected to line and their positive poles to earth. The polarity of the current directed over main line L' is entirely dependent upon the transmitter A, transmitter B only serving to make an auxiliary connection for the insertion of M' B in the circuit.

With the arrangement here shown it will be seen that after the printing of any character, as C, characters in the following groups at the left of the vertical line of keys, including C, cannot be printed without first rotating the transmitters and the type-wheels to a zero or unison position—that is to say, after printing C none of the letters G, H, M, N, S, T, Y, Z could be printed without first going to zero, and the same is true in respect to the figure key-board. Likewise, upon printing the letter F only the characters L, R, X, &c., in the last vertical line could be printed without first going to zero. If, for instance, it were attempted after printing the letter F to immediately print the letter G by depressing the key G, an impulse would be transmitted over each of the main lines, which would result in causing the type-wheels to be rotated the space of six letters by the group-escapement, and also the space of one letter by the letter-escapement. By depressing G immediately after F the type-wheel would be rotated the space of seven letters, instead of one letter. In other words, the type-wheel would be rotated too far by the space of an entire group, or six characters. For this reason in the course of transmission characters in succeeding groups must be selected upon the key-board at the right or below the one last printed; otherwise the type-wheel and transmitters must first be rotated to zero. But even by preserving the method which I have just described in successively selecting characters upon the key-board it is obvious that the type-wheels would be out of unison with the transmitter after the first rotation, providing characters, during the first rotation, had been printed. It is necessary, therefore, after printing characters during any one rotation to let the type-wheels run to unison, and to then lock the transmitters at their unison-point and thereafter permit the transmitters and type-wheels to start anew. To this end I have shown the ordinary form of unison in Fig. 1ª, which is brought into action to lock the type-wheels at the end of two rotations. The transmitters are permitted to run freely for a sufficient length of time to cause the unisons of the receiving-instruments to lock the type-wheels, when the transmitters are locked in corresponding unison position and in readiness to start in unison with the type-wheels upon their release, which is effected by the press-lever F P forcing the unison-arm s n against its back-stop s q.

The construction of the transmitter-boards is as follows: The base-board of each transmitter is constructed of conducting material, and board L B is connected by wire 92 and board F B by wire 91 with the local battery L B'. When the transmitting-keys are undepressed, the branch wires leading from the transmitters are metallically unconnected with the boards L B and F B. When, however, a key is depressed—for example, as A—the wires 31 and 41 are metallically connected with each other and with the base-board L B, and the same is true of the two conductors which intersect at each of the keys.

The two transmitters A and B are entirely independent in respect to the transmission of impulses for controlling the respective escapements of the receiving-instrument.

As above described, where releasing anchors are employed two independent propelling-motors should be used. The necessity for employing a motor geared directly with the shaft $a\,l$ arises from the fact that during the operation of that one of the escapements by means of which the sleeve is rotated about the shaft the sleeve and shaft are not rigidly locked together. Thus if the two escapements were operating at the same time sufficient tension might not be imparted from the motor gearing with the sleeve to drive the shaft with sufficient force or regularity.

What I desire to claim and secure by Letters Patent is—

1. In a printing-telegraph, the combination of a shaft, a type-wheel mounted loosely upon said shaft, independent motors respectively tending to rotate the type-wheel and shaft continuously in the same direction, an escapement for controlling the step-by-step rotation of the shaft, and a second escapement for the type-wheel, the releasing mechanism of which is affixed to and rotated by said shaft.

2. In a printing-telegraph, the combination of a continuously-driven type-wheel and a shaft independently driven continuously in the same direction, and escapement for controlling the step by step rotation of the shaft, and a second escapement for the type-wheel, the releasing mechanism of which is affixed to and rotated by said shaft.

3. In a printing-telegraph, the combination of a shaft, a sleeve carrying a type-wheel mounted loosely upon said shaft, independent motors respectively tending to rotate the sleeve and shaft in the same direction, an escapement for controlling the step-by-step rotation of the shaft, and a second escapement for the sleeve, the releasing mechanism of which is affixed to and rotated by said shaft, whereby the two escapements are capable of simultaneous independent action.

4. In a printing telegraph, the combination of a shaft, a type-wheel mounted upon a sleeve, a step-by-step impelling mechanism for said shaft, an independent step-by-step impelling mechanism carried by and with the shaft and co-operating with an engaging device upon the sleeve for rotating the type-wheel around the same, whereby the action of one mechanism supplements that of the other in bringing the type-wheel into position to print.

5. In a printing-telegraph, the combination of a shaft, a type-wheel mounted upon a sleeve, a long step-by-step impelling mechanism for said shaft, an independent short step-by-step impelling mechanism carried by and with the shaft and co-operating with an engaging device upon the sleeve for rotating the type-wheel around the same, whereby the action of one mechanism supplements that of the other in bringing the type-wheel into position to print.

6. In a printing telegraph, the combination of a shaft, a type-wheel mounted upon an independent bearing, a step-by-step impelling mechanism for said shaft, an independent step-by-step impelling mechanism carried by and with the shaft and co-operating with an engaging device connected with the type-wheel for rotating said wheel in respect to the shaft, whereby the action of one mechanism supplements that of the other in bringing the type-wheel into position to print.

7. In a printing-telegraph, the combination of a shaft, a type-wheel mounted upon an independent bearing, a step-by-step impelling mechanism for rotating said shaft, a second step-by-step mechanism joining said shaft and type-wheel, whereby the type-wheel may either be locked to or rotated in respect to the shaft and the action of one mechanism made to supplement that of the other in bringing the type-wheel into position to print.

8. In a printing-telegraph, the combination of a rotating shaft, a type-wheel loosely mounted thereon, an arm rigidly fixed to said shaft carrying an escapement-anchor, and an escapement-wheel rigidly fixed to the type-wheel, whose step-by-step rotation around the shaft is controlled by said rotating anchor.

9. In a printing-telegraph, the combination of two type-wheels rigidly connected together upon a sleeve, a shaft upon which said sleeve may rotate, an electro-magnetic escapement for controlling the rotation of said sleeve, an independent clock-motor for propelling said sleeve, a second escapement for controlling the step-by-step rotation of the shaft, a second clock-motor for propelling said shaft, two independent press devices and two main lines, one including the magnets of one press mechanism and one escapement and the other the magnets of the second press mechanism and the second escapement.

10. In a printing-telegraph, the combination of a receiving-instrument having a rotating shaft and an escapement for controlling its movement, a type-wheel loosely connected thereto, an anchor mounted upon and rotating with said shaft, and an escapement-wheel rigidly fixed to the type-wheel for controlling the step-by-step rotation of the type-wheel around the shaft, and two transmitters for respectively controlling said escapement.

11. In a printing-telegraph system, the combination of two transmitters, a receiving-instrument having two escapements, the action of one being supplemental to that of the other in rotating the type-wheels, two type-wheels carrying, respectively, different classes of characters, two press mechanisms for effecting printing from one type-wheel or the other at the pleasure of the transmitting-operator, two supplemental main-line batteries for actuating one press mechanism or the other, and two transmitting-boards having their characters arranged to correspond with those of the two type-wheels.

12. In a printing-telegraph system, the combination of two independent transmitters, a receiving-instrument having two type-wheels mounted upon a sleeve, the latter being carried upon a shaft, two escapement devices, one for rotating both shaft and sleeve and the other for rotating the sleeve around the shaft, two press mechanisms, two main lines, each including a press magnet and an escapement-magnet, independent batteries for controlling the operation of said escapement, additional batteries which are brought into circuit to actuate one press device or the other, and two key-boards respectively provided with characters corresponding with those of the two type-wheels.

13. In a printing-telegraph system, the combination of two main lines, two transmitters, a receiving-instrument having two independent escapements whose actions are supplemental one to the other, two type-wheels, two press devices, and two supplemental main-line batteries, M B and M' B, so arranged that one or the other of said batteries will be brought into action, as and for the purpose described.

14. In a printing-telegraph system, a receiving-instrument having two independent escapements whose actions are supplemental to the other, two type-wheels, two press mechanisms, two main lines, two independent transmitters, each of which is provided with two rotating arms, a series of relay-magnets for arresting one of said arms and making electrical connections, a second series of stop-magnets for arresting the other arm, local circuits connecting the key-boards with the relay and stop magnets of the transmitter, substantially as described, main-line batteries X and Y for controlling the type-wheel rotation, supplemental batteries M B and M' B, which are brought into action, substantially as described, upon arresting the arm of one transmitter by a relay-magnet and the arm of the other transmitter by a stop-magnet, or vice versa, as and for the purpose described.

BRADLEY A. FISKE.

Witnesses:
WM. ARNOUX,
JOHN C. SANDERS.